(12) United States Patent
Qu et al.

(10) Patent No.: US 12,101,851 B2
(45) Date of Patent: Sep. 24, 2024

(54) METHODS, NETWORK FUNCTION NODES AND COMPUTER READABLE MEDIA FOR CONTENTS COMMUNICATION MANAGEMENT

(71) Applicant: Telefonaktiebolaget LM Ericsson (publ), Stockholm (SE)

(72) Inventors: Zhiwei Qu, Shanghai (CN); Yin Wang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 424 days.

(21) Appl. No.: 17/635,410

(22) PCT Filed: Aug. 21, 2019

(86) PCT No.: PCT/CN2019/101797
§ 371 (c)(1),
(2) Date: Feb. 15, 2022

(87) PCT Pub. No.: WO2021/031152
PCT Pub. Date: Feb. 25, 2021

(65) Prior Publication Data
US 2022/0353668 A1 Nov. 3, 2022

(51) Int. Cl.
*H04W 48/18* (2009.01)
*H04W 4/14* (2009.01)
*H04W 8/18* (2009.01)

(52) U.S. Cl.
CPC ............. *H04W 8/186* (2013.01); *H04W 4/14* (2013.01)

(58) Field of Classification Search
None
See application file for complete search history.

(56) References Cited

U.S. PATENT DOCUMENTS

| | | |
|---|---|---|
| 9,204,269 B1 | 12/2015 | Cham et al. |
| 10,375,665 B2 | 8/2019 | Li et al. |
| 2009/0221310 A1 | 9/2009 | Fang et al. |
| 2017/0171814 A1 | 6/2017 | Belghoul et al. |
| 2019/0150225 A1 | 5/2019 | Mohamed et al. |

FOREIGN PATENT DOCUMENTS

| | | |
|---|---|---|
| CN | 1004665572 C | 3/2009 |
| CN | 109315003 A | 2/2019 |

OTHER PUBLICATIONS

Supplementary European Search Report for European Patent Application No. 19942458.1, mailed Jul. 5, 2022, 17 pages.

(Continued)

*Primary Examiner* — Gary Lafontant
(74) *Attorney, Agent, or Firm* — Sage Patent Group

(57) ABSTRACT

The present disclosure provides methods and network function nodes for managing a communication of contents for a first UE. The method includes retrieving subscription data for the first UE from a third NF node, the subscription data indicating an identifier of a second UE which is a target of the contents for the first UE, transmitting the contents and the identifier of the second UE to a second NF node, receiving a message built with the contents from the second NF node, and transmitting the message to the second UE. The present disclosure further provides corresponding computer readable medium.

17 Claims, 11 Drawing Sheets

(56) References Cited

OTHER PUBLICATIONS

3rd Generation Partnership Project; Technical Specification Group Services and System Aspects; Procedures for the 5G System; Stage 2 (Release 15), 3GPP TS 23.502, V15.6.0, Jun. 2019, Valbonne, France, 38 pages.

International Search Report and Written Opinion of the International Searching Authority, PCT/CN2019/101797, mailed May 20, 2020, 7 pages.

Ericsson et al., Application Trigger procedure updates, 3GPP TSG-SA Meeting #125, S2-181357 (Revision of S2-181131 and 0470), Gothenburg, Sweden, Jan. 22-26, 2018, 10 pages.

$3^{rd}$ Generation Partnership Project; Technical Specification Group Services Aspects; 3GPP TS 23.501 v16.1.0 (Jun. 2019), System Architecture for the 5G System; Stage 2 (Release 16), 368 pages.

$3^{rd}$ Generation Partnership Project; Technical Specification Group Services Aspects; 3GPP TS 23.502 v16.1.1 (Jun. 2019), Procedures for the 5G System; Stage 2 (Release 16), 495 pages.

$3^{rd}$ Generation Partnership Project; Technical Specification Group Core Network and Terminals; 3GPP 23.040 v15.3.0 (Mar. 2019), Technical realization of the Short Message Service (SMS) (Release 15), 216 pages.

Communication Pursuant to Article 94(3) EPC, European Patent Application No. 19942458.1, mailed Jun. 19, 2023, 10 pages.

"3rd Generation Partnership Project; Technical Specification Group Core Network; IP Multimedia (IM) Session Handling; IP Multimedia (IM) call model (Release 5)", 3GPP Standard; 3GPP TS 23.218, 3rd Generation Partnership Project (3GPP), XP050361556, Feb. 1, 2002, France.

METHODS, NETWORK FUNCTION NODES AND COMPUTER READABLE MEDIA FOR CONTENTS COMMUNICATION MANAGEMENT

CROSS REFERENCE TO RELATED APPLICATIONS

This application is a 35 U.S.C. § 371 national stage application of PCT International Application No. PCT/CN2019/101797 filed on Aug. 21, 2019, the disclosure and content of which is incorporated by reference herein in its entirety.

TECHNICAL FIELD

The present disclosure generally relates to the technical field of telecommunication, and particularly to methods and Network Function (NF) nodes for managing a communication of contents for a User Equipment (UE) and corresponding computer readable media.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Fifth Generation (5G) networks, a Network Slice is introduced as a logical network that provides specific network capabilities and network characteristics. An instance of a network slice (e.g. a network slice instance, NSI) is a set of Network Function (NF) instances and the required resources (e.g., compute, storage, and networking resources) which form a deployed Network Slice. A NF is a 3GPP adopted or 3GPP defined processing function in a network, which has defined functional behavior and 3GPP defined interfaces. An NF can be implemented either as a network element on dedicated hardware, a software instance funning on a dedicated hardware, or as a virtualized functional instantiated on an appropriate platform, e.g., on a cloud infrastructure.

The network sometimes transmits a message to a UE. The message received at the UE is only known to the UE, but it is not visible for the real user of the UE. For example, the network sometimes would reject the UE requests with the cause code in the Non-Access-Stratum (NAS) response e.g.

Missing or Unknown APN (#27)
Unknown PDP Address or PDP Type (#28)
Service Option not Supported (#32)
Requested Service Option not Subscribed (#33)
Network Failure (#38)
Maximum Number of PDP Contexts Reached (#65)

In such case, the NAS cause code is only known by the UE which is e.g., a machine, there is no way to tell the user who could adjust some parameters to help to shoot the trouble. The end user is not able to get the report for the related failure cause code and take corresponding action. It will prolong the feedback loop to locate the problem and shoot the trouble, and it would dissatisfy the end user's experience.

SUMMARY

At least some objects of the present disclosure are to provide technical solutions capable of communicating contents for a UE to a user who controls the UE so that the user can take actions in response to the contents.

According to one aspect of the present disclosure, there is provided a method implemented at a first network function node for managing a communication of contents for a first User Equipment (UE). The method comprises retrieving subscription data for the first UE from a third network function node, the subscription data indicating an identifier of a second UE which is a target of the contents for the first UE. The method further comprises transmitting the contents and the identifier of the second UE to a second network function node, receiving a message built with the contents from the second network function node, and transmitting the message to the second UE.

In an exemplary embodiment, the second UE is different from or same as the first UE.

In an exemplary embodiment, prior to receiving the message, the method further comprises performing a reachability enabling procedure to the second UE in response to receiving a reachability enabling request from the second network function node, and responding the second network function node with a reachability enabling response to indicate that the second UE is reachable.

In an exemplary embodiment, after transmitting the message, the method further comprises, in response to receiving an acknowledgement message from the second UE to acknowledge the receipt of the message, forwarding the acknowledgement message to the second network function node.

In an exemplary embodiment, the message is a Short Message Service (SMS) message and the second network function node is a Short Message Service Function (SMSF) node.

In an exemplary embodiment, the third network function node is a Unified Data Management (UDM) node, and the subscription data indicates whether the contents for the first UE are allowed to be forwarded.

In an exemplary embodiment, the identity of the second UE is an International Mobile Subscriber Identification (IMSI) number of the second UE.

In an exemplary embodiment, the first network function node is an Access and Mobility Management Function (AMF) node.

According to another aspect of the present disclosure, there is provided a method implemented at a second network function node for managing a communication of contents for a User Equipment (UE). The method includes receiving contents and an identifier of the UE from a first network function node, building a message with the contents, and transmitting the message to the first network function node.

In an exemplary embodiment, prior to transmitting the message, the method further includes transmitting a reachability enabling request to the first network function node, and receiving from the first network function node a reachability enabling response indicating that the UE is reachable.

In an exemplary embodiment, the method further includes receiving an acknowledgement message from the UE to acknowledge a receipt of the message via the first network function node.

In an exemplary embodiment, the message is a Short Message Service (SMS) message and the second network function node is a Short Message Service Function (SMSF) node.

In an exemplary embodiment, the first network function node is an Access and Mobility Management Function (AMF) node.

According to another aspect of the present disclosure, there is provided a method implemented at a third network function node for managing a communication of contents for a first User Equipment (UE). The method includes receiving a subscription data request with an identifier of the first UE from a first network function node, determining whether contents for the first UE are allowed to be forwarded, identifying a second UE which is a target of the contents for the first UE based on the determining, and transmitting a subscription data response with an identifier of the second UE to the first NF node.

In an exemplary embodiment, the third network function node is preconfigured with information indicating whether contents for the first UE are allowed to be forwarded and indicating the second UE different from the first UE if the contents for the first UE are allowed to be forwarded.

In an exemplary embodiment, he second UE is the same as the first UE if it is determined that contents for the first UE are not allowed to be forwarded. In an exemplary embodiment, the first network function node is an Access and Mobility Management Function (AMF) node and the third network function node is a Unified Data Management (UDM) node.

According to another aspect of the present disclosure, a first NF node for managing a communication of contents for a first UE is provided, comprising: a communication interface arranged for communication, at least one processor, and a memory comprising instructions which, when executed by the at least one processor, cause the first NF node to retrieve subscription data for the first UE from a third network function node, the subscription data indicating an identifier of a second UE which is a target of the contents for the first UE, transmit the contents and the identifier of the second UE to a second network function node, receive a message built with the contents from the second network function node, and transmit the message to the second UE.

According to another aspect of the present disclosure, a second NF node for managing a communication of contents of a UE is provided, comprising: a communication interface arranged for communication, at least one processor, and a memory comprising instructions which, when executed by the at least one processor, cause the second NF node to receive contents and an identifier of the UE from a first network function node, build a message with the contents, and transmit the message to the first network function node.

According to another aspect of the present disclosure, a third NF node for managing a communication of contents for a first UE is provided, comprising: comprising: a communication interface arranged for communication, at least one processor, and a memory comprising instructions which, when executed by the at least one processor, cause the third NF node to receive a subscription data request with an identifier of the first UE from a first network function node, determine whether contents for the first UE are allowed to be forwarded, identify a second UE which is a target of the contents for the first UE based on the determining, and transmit a subscription data response with an identifier of the second UE to the first network function node.

According to another aspect of the present disclosure, a computer readable medium which stores computer program comprising instructions which, when executed on at least one processor, cause the at least one processor to perform the methods for managing a communication of a UE's contents as discussed previously.

According to the above technical solutions of the present disclosure, the contents for the first UE are transmitted to the second UE in the message. If it is preconfigured in the third NF node (for example, a UDM node) with information indicating that contents for the first UE are allowed to be forwarded and indicating a second UE different from the first UE, in a case that the contents for the first UE is a NAS cause code and the second UE is, for example, a mobile phone of the user of the first UE, the user can know the trouble and adjust some parameters of the first UE to help to shoot the trouble indicated by the NAS cause node.

BRIEF DESCRIPTION OF THE DRAWINGS

The objects, advantages and characteristics of the present disclosure will be more apparent, according to descriptions of preferred embodiments in connection with the drawings, on which.

Figure 1:
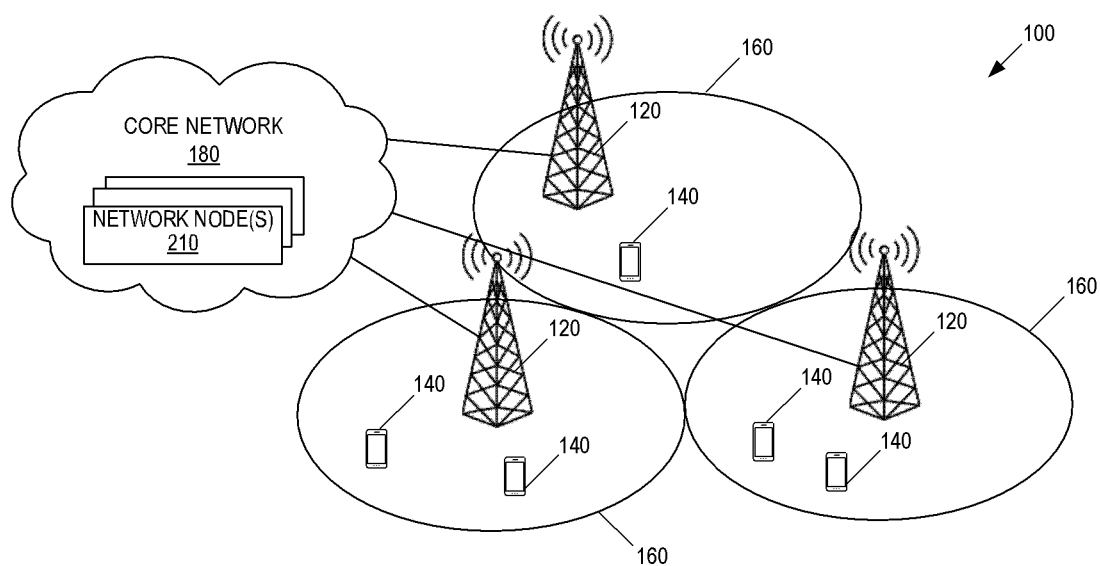
FIG. 1 illustrates one example of a wireless communication system in which embodiments of the present disclosure may be implemented.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

Hereinafter, the principle and spirit of the present disclosure will be described with reference to illustrative embodiments. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in references as follows:

1) 3GPP 23.501, V16.1.0, (2019-06),
2) 3GPP 23.502, V16.1.1 (2019-06), and
3) 3GPP 23.040, V15.3.0 (2019-03).

References in this specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of the skilled in the art to affect such feature, structure, or characteristic in connection with other embodiments whether or not explicitly described.

The terminology used herein is for the purpose of describing particular embodiments only and is not intended to be liming of exemplary embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single Carrier-Frequency Division Multiple Access (SC-FDMA), Long Term Evolution (LTE) and other networks developed in the future. The terms "network" and "system" are sometimes used interchangeably. For illustration only, certain aspects of the techniques are described below for the next, i.e. the $5^{th}$ generation of wireless communication network. However, it will be appreciated by the skilled in the art that the techniques described herein may also be used for other wireless networks such as LTE and corresponding radio technologies mentioned herein as well as wireless networks and radio technologies proposed in the future.

As used herein, the term "UE" may be, by way of example and not limitation, a User Equipment (UE), a SS (Subscriber Station), a Portable Subscriber Station (PSS), a Mobile Station (MS), a Mobile Terminal (MT) or an Access Terminal (AT). The UE may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In the following description, the terms "UE", "terminal device", "mobile terminal" and "user equipment" may be used interchangeably.

FIG. 1 illustrates one example of a wireless communication system 100 in which embodiments of the present disclosure may be implemented. The wireless communication system 100 may be a cellular communications system such as, for example, a 5G New Radio (NR) network or an LTE cellular communications system. As illustrated, in this example, the wireless communication system 100 includes a plurality of radio access nodes 120 (e.g., evolved Node B:s (eNBs), 5G base stations which are referred to as gNBs, or other base stations or similar) and a plurality of wireless communication devices 140 (e.g., conventional UEs, Machine Type Communication (MTC)/Machine-to-Machine (M2M) UEs). The wireless communication system 100 is organized into cells 160, which are connected to a core network 180 via the corresponding radio access nodes 120. The radio access nodes 120 are capable of communicating with the wireless communication devices 140 (also referred to herein as communication device 140 or UEs 140) along with any additional elements suitable to support communication between wireless communication devices or between a wireless communication device and another communication device (such as a landline telephone). The core network 180 includes one or more network node(s) or function(s) 210. In some embodiments, the network nodes/functions 210 may comprise, for example, any of the network functions shown in FIGS. 2-3.

Figure 2:
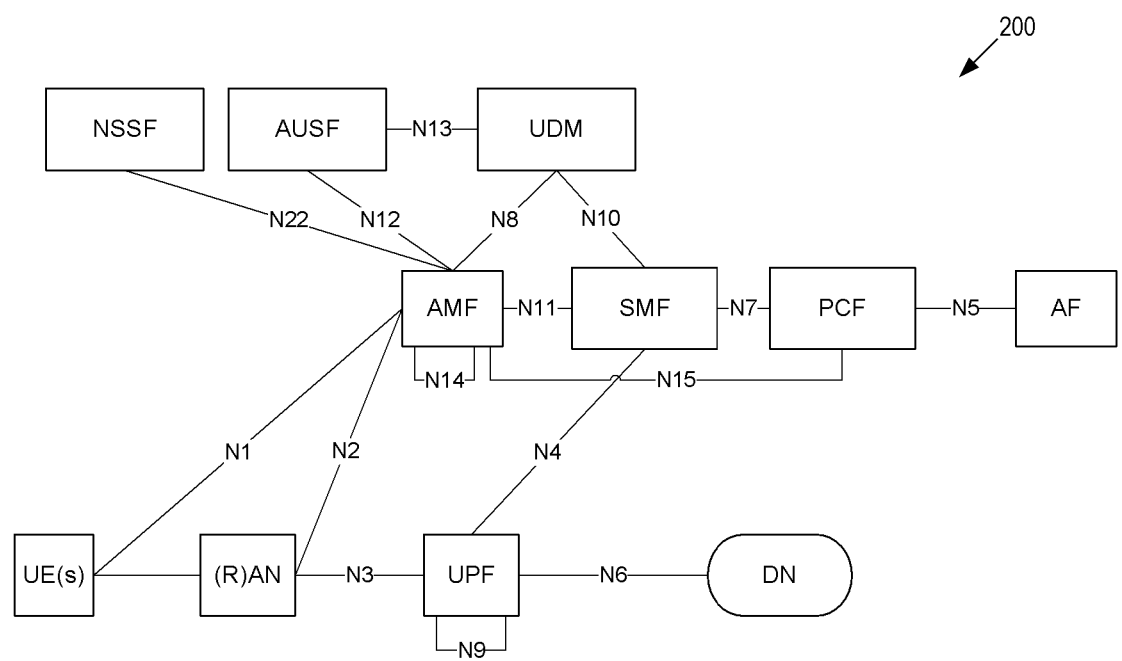
FIG. 2 illustrates a wireless communication system represented as a 5G network architecture composed of core NFs.

FIG. 2 illustrates a wireless communication system 200 represented as a 5G network architecture composed of core NFs, where interaction between any two NFs is represented by a point-to-point reference point/interface.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g. such as evolved Node Bs (eNBs) or 5G base stations (gNBs) or similar. Seen from the core network side, the 5G core NFs shown in FIG. 2 include a Network Slice Selection Function (NSSF), an Authentication Server Function (AUSF), a Unified Data Management (UDM), an Access and Mobility Management Function (AMF), a Session Management Function (SMF), a Policy Control Function (PCF), an Application Function (AF).

Reference point representations of the 5G network architecture are used to develop detailed call flows in the normative standardization. The N1 reference point is defined to carry signaling between UE and AMF. The reference points for connecting between AN and AMF and between AN and UPF are defined as N2 and N3, respectively. There is a reference point, N11, between AMF and SMF, which implies that SMF is at least partly controlled by AMF. N4 is used by SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since PCF applies policy to AMF and SMP, respectively. N12 is required for the AMF to perform authentication of the UE. N8 and N10 are defined because the subscription data of UE is required for AMF and SMF.

The 5G core network aims at separating user plane and control plane. The user plane carries user traffic while the control plane carries signaling in the network. In FIG. 2, the UPF is in the user plane and all other NFs, i.e., AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
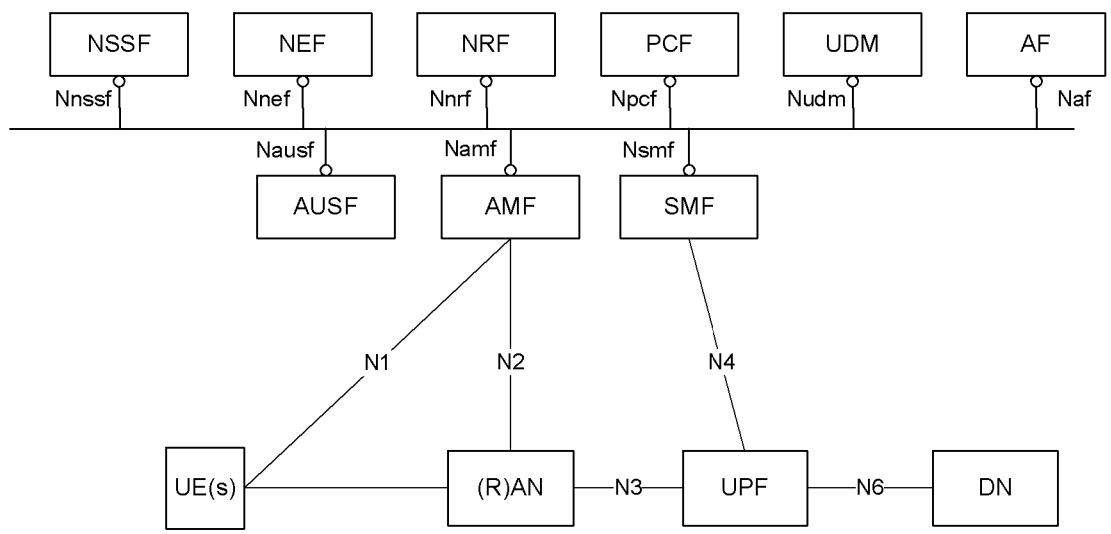
FIG. 3 illustrates a 5G network architecture using service-based interfaces between the NFs in the control plane, instead of the point-to-point reference points/interfaces used in the 5G network architecture of FIG. 2.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF and Nsmf for the service based interface of the SMF etc. The Network Exposure Function (NEF) and the Network Function Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2-3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to PCF responsible for policy control in order to support Quality of Service (QoS). Based on the information, PCF determines policies about mobility and session management to make AMF and SMF operate properly. The AUSF supports authentication function for UEs or similar and thus stores data for authentication of UEs or similar while UDM stores subscription data of UE. The Data Network (DN), not part of the 5G core network, provides Internet access or operator services and similar.

A 5G system generally provides various services, including e.g., Short Message Service (SMS), Location Services, Emergency Services, and others.

Figure 4A:
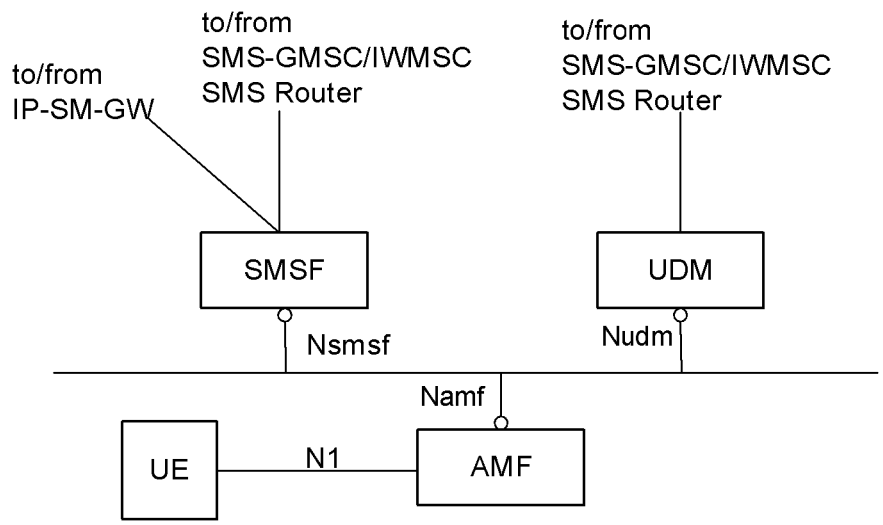
FIG. 4A illustrates a non-roaming architecture to support SMS over NAS using the Service-based interfaces within the Control Plane (CP) and FIG. 4B illustrates a roaming architecture to support SMS over NAS using the reference point representation.
Figure 4B:
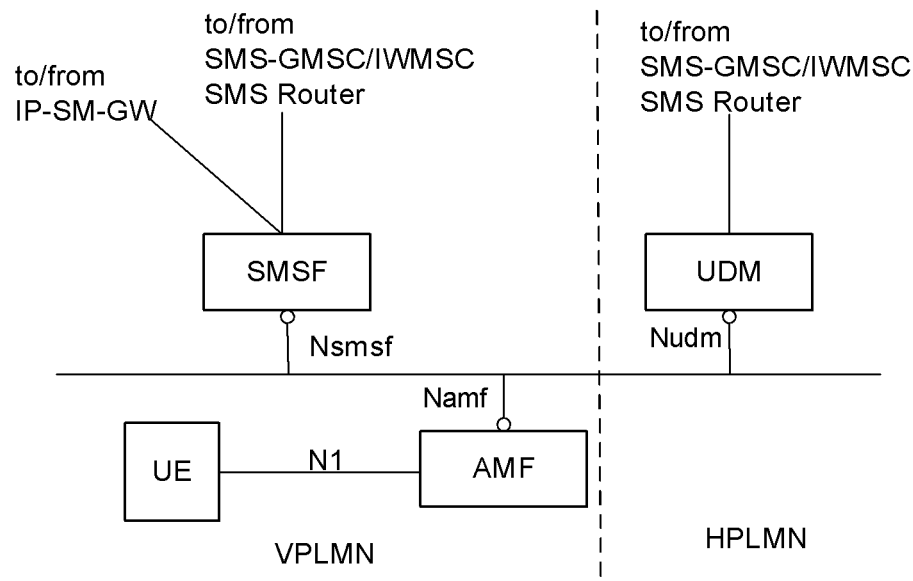

FIG. 4A illustrates a non-roaming architecture to support SMS over NAS using the Service-based interfaces within the Control Plane while FIG. 4B illustrates a roaming architecture to support SMS over NAS using the reference point representation.

A SMS Function (SMSF) may be connected to the SMS-GMSC/IWMSC/SMS Router via one of the standardized interfaces as shown in TS 23.040. A UDM may be connected to the SMS-GMSC/IWMSC/SMS Router via one of the standardized interfaces as shown in TS 23.040. Each UE is associated with only one SMS Function in the registered PLMN.

Hereinafter, a method for managing a communication of contents for a first UE according to an exemplary embodiment of the present disclosure will be described with reference to FIGS. 5-7.

Figure 5:
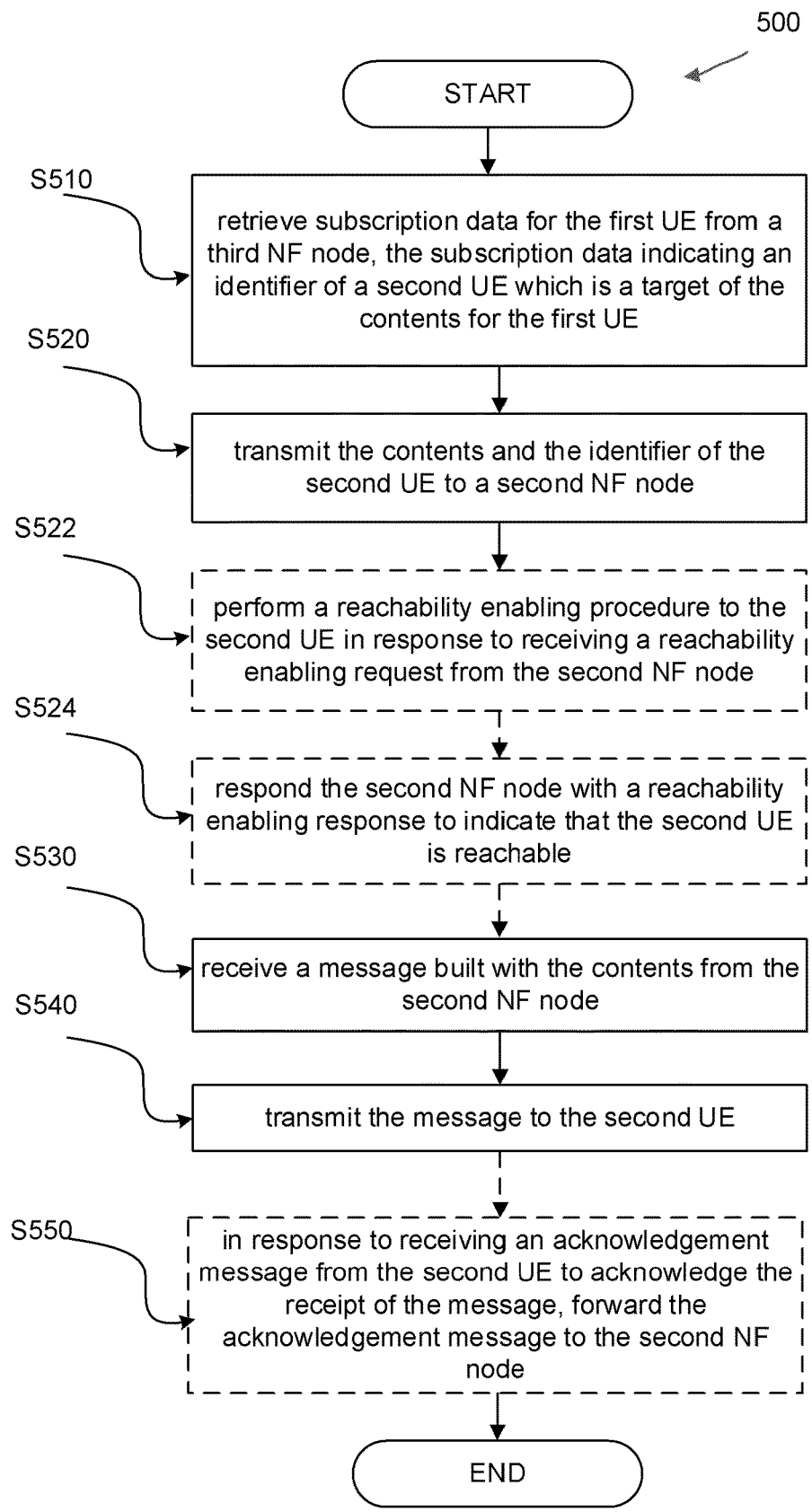
FIG. 5 illustratively shows a flowchart of a method for managing a communication of contents for a first UE according to an exemplary embodiment of the present disclosure.

FIG. 5 illustratively shows a flowchart of a method 500 for managing a communication of contents for a first UE according to an exemplary embodiment of the present disclosure. In an embodiment, the method 500 may be performed at a first NF node.

The method is initiated upon there are contents for a first UE to be communicated to another UE different from the first UE.

As shown in FIG. 5, the method 500 may include Steps S510~S540.

In Step S510, the first NE node retrieves subscription data for the first UE from a third NF node, the subscription data indicating an identifier of a second UE which is a target of the contents for the first UE. The method then proceeds to step S520, where the first NF node transmits the contents and the identifier of the second UE to a second NF node, who can build a message with the contents. In step S530, the first NF node receives a message built with the contents from the second NF node, and then transmits the message to the second UE in step S540. An example of Steps S510, S520, S530 and S540 is Steps S804, S810, S814 and S822 shown in FIG. 8.

Before step S530, the first NF node may receive a reachability enabling request from the second NF node to determine whether the second UE is reachable. Then in step S522, the first NF performs a reachability enabling procedure to the second UE. For example, the first NF node pages the second UE, and the second UE responds to the page with a Service Request message. The first NF node then responds the second NF node with a reachability enabling response to indicate that the second UE is reachable in step S524. An example of Steps S522 and S524 is Step S816 and S818 shown in FIG. 8.

After transmitting the message to the second UE, the first NF node may receive an acknowledgement message from the second UE to acknowledge the receipt of the message. In such a case, the first NF node forwards the acknowledgement message to the second NF node in step S550. An example of Step S550 is Step S826 shown in FIG. 8.

Please note that the terms "reachability enabling request" and "reachability enabling response" as used herein are named for illustrating a request and a response for enabling a reachability of a target (for example, the second UE), but not for limiting the meaning or scope of the description reciting these terms. The terms "first UE" and "second UE" as used herein are named for referring to a UE, and they both may be different or the same, unless explicitly stated otherwise.

In an exemplary embodiment of the present disclosure, the second UE may be different from the first UE, or same as the first UE. That is, if the subscription data indicates a different second UE, the contents for the first UE can be forwarded to the second UE. Otherwise, if the second UE indicated by the subscription data is the same as the first UE, the contents for the first UE cannot be forwarded to a different UE, and only can be forwarded to the first UE.

In an exemplary embodiment of the present disclosure, the message is a Short Message Service (SMS) message and the second NF node is a Short Message Service Function (SMSF) node.

In an exemplary embodiment of the present disclosure, the third NF node is a Unified Data Management (UDM) node, and the subscription data indicates whether the contents for the first UE are allowed to be forwarded.

In an exemplary embodiment of the present disclosure, the identity of the second UE is an International Mobile Subscriber Identification (IMSI) number of the second UE.

In an exemplary embodiment of the present disclosure, the first NF node is an Access and Mobility Management Function (AMF) node.

According to the embodiment of the present disclosure, when there are contents for a first UE which shall be communicated to a second UE associated with the first UE, the first NF node retrieves subscription data for the first UE from a third NF node, to get an identifier of a second UE which is a target of the contents for the first UE. The first NF node then transmits the contents and the identifier of the second UE to a second NF node which can build a message, for example, a SMS message with the contents. The first NF node then receives the message built by the second NF node and transmits the message to the second UE. According to the embodiment of the present disclosure, the contents for a first UE can be transferred to a second UE which is associated with the UE.

Figure 6:
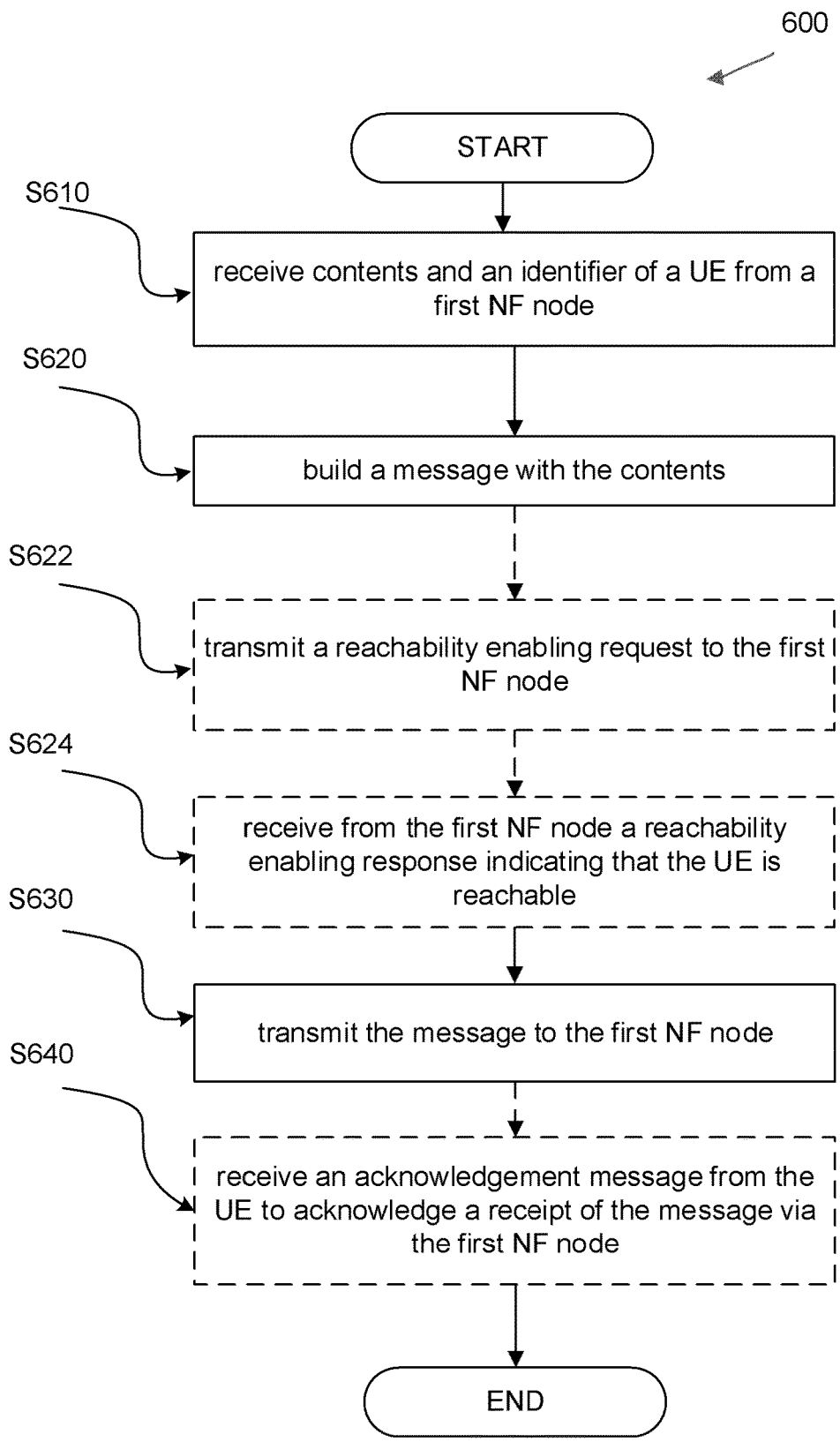
FIG. 6 illustratively shows a flowchart of a method for managing a communication of contents of a UE according to an exemplary embodiment of the present disclosure.

FIG. 6 illustratively shows a flowchart of a method 600 for managing a communication of contents of a UE according to an exemplary embodiment of the present disclosure. In an embodiment, the method 600 may be performed at a second NF node.

As shown in FIG. 6, the method 600 may include Steps S610–S630.

In Step S610, the second NF node receives contents and an identifier of the UE from a first NF node. In response to receiving the contents, the second NF node builds a message with the contents in step S620, and transmits the built message to the first NF node in step S630. An example of Steps S610, S620 and S630 is Steps S810, S812 and S820 shown in FIG. 8.

In an exemplary embodiment of the present disclosure, in response to receiving the contents and the identifier of the UE, the second NF may transmit a reachability enabling request to the first NF node in step S622, to enable the reachability of the UE. The second NF then receive from the first NF node a reachability enabling response indicating that the UE is reachable in step S624. After determining the UE is reachable, the second NF node then proceeds to step S620 to build the message. An example of Steps S622 and S624 is Steps S814 and S818 shown in FIG. 8.

In an exemplary embodiment of the present disclosure, after transmitting the message to the first NF node, the second NF node may receive an acknowledgement message from the UE to acknowledge a receipt of the message via the first NF node in step S640. An example of Step S640 is Step S826 shown in FIG. 8.

Please note that the steps in FIG. 6 are exemplified in the order as shown. Some steps such as S620 and S622 and S624 may be performed in a different order, e.g. in parallel or in a reverse order.

In an exemplary embodiment of the present disclosure, the message is a Short Message Service (SMS) message and the second NF node is a Short Message Service Function (SMSF) node.

In an exemplary embodiment of the present disclosure, the first NF node is an Access and Mobility Management Function (AMF) node.

According to the embodiment of the present disclosure, the second NF node, when receiving contents and an identifier of a second UE from a first NF node, realizes that the first NF node has contents to be transmitted to the UE. Then the second NF node builds a message, for example, a SMS message with the contents and transmits the built message to the first NF node. The second NF node is responsible for building a message with contents destinated to a UE (for example, a second UE). The first NF node then can transmit the message to the second UE.

Figure 7:
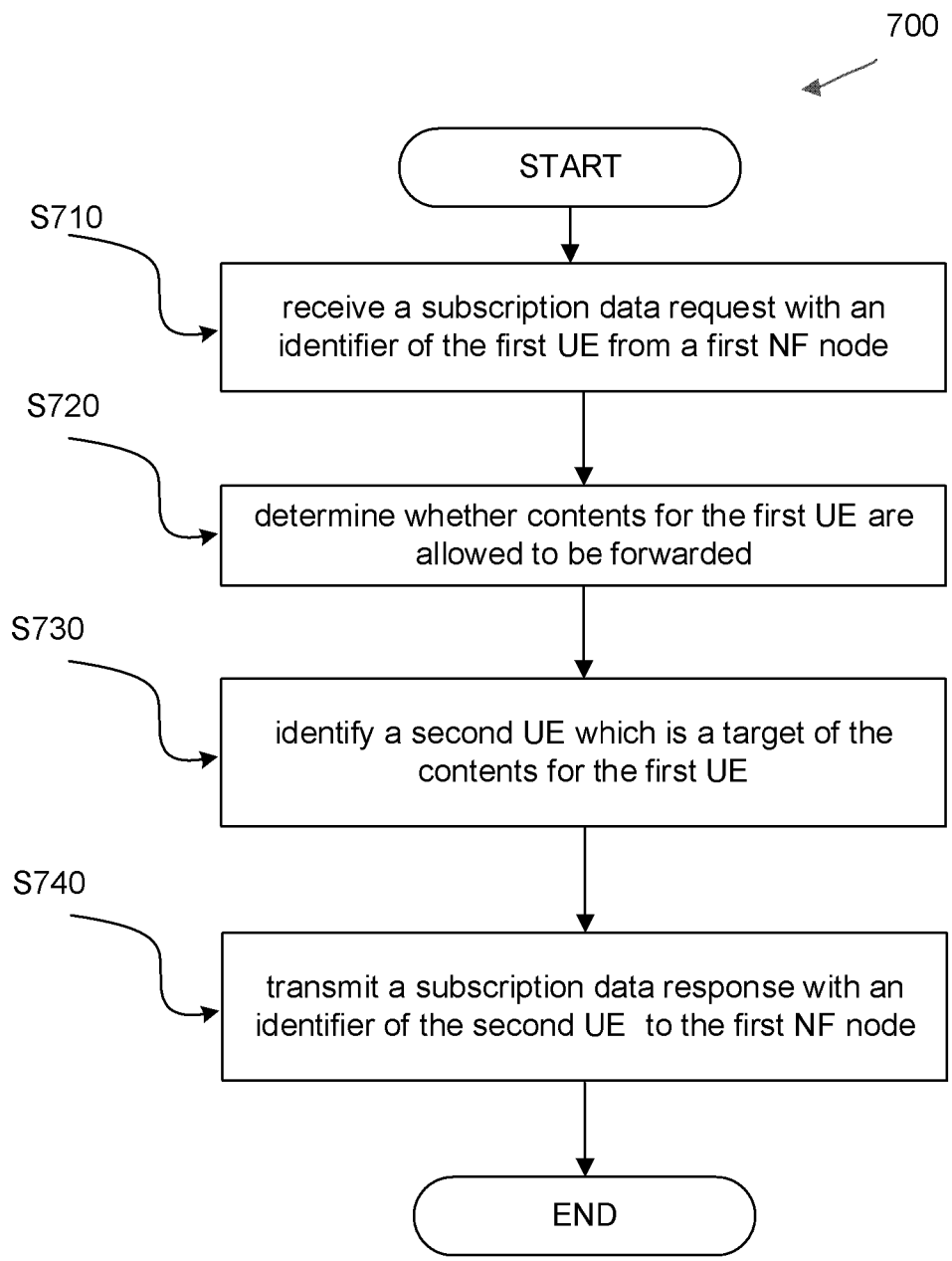
FIG. 7 illustratively shows a flowchart of a method for managing a communication of contents for a first UE according to an exemplary embodiment of the present disclosure.

FIG. 7 illustratively shows a flowchart of a method 700 for managing a communication of contents for a first UE according to an exemplary embodiment of the present disclosure. In an embodiment, the method 700 may be performed at a third NF node.

As shown in FIG. 7, the method 700 may include Steps S710–S740.

In Step S710, the third NF node receives a subscription data request with an identifier of the first UE from a first NF node. The third NF node then determines whether contents for the first UE are allowed to be forwarded in step S720. In step S730, the third NF node identifies a second UE which is a target of the contents for the first UE based on the determining in step S720. The third NF node then transmits a subscription data response with an identifier of the second UE to the first NF node in step S740. An example of Steps S710, S720, S730 and S740 is Steps S804, S806 and S808 shown in FIG. 8.

In an exemplary embodiment of the present disclosure, the third NF node is preconfigured with information indicating whether contents for the first UE are allowed to be forwarded and indicating the second UE different from the first UE if the contents for the first UE are allowed to be forwarded. The third NF node, when receiving a subscription data request with an identifier of the first UE from a first NF node, looks in its preconfigured information to determine whether contents for the first UE are allowed to be forwarded and identifies the second UE that shall receive the contents for the first UE.

In an exemplary embodiment of the present disclosure, if it is determined that contents for the first UE are not allowed to be forwarded, the third NF node identifies the contents for the first UE cannot be forwarded to a different UE, and identifies the second UE as the first UE.

In an exemplary embodiment of the present disclosure, the first NF node is an Access and Mobility Management Function (AMF) node and the third NF node is a Unified Data Management (UDM) node.

According to the embodiment of the present disclosure, the third NF node, when receiving a subscription data request with an identifier of the first UE from a first NF node, realizes that the first NF node desires to determine the target UE to receive contents of the first UE. The third NF node then determines whether contents for the first UE are allowed to be forwarded, and if they are allowed, determines a target UE, for example a second UE, and transmits an identifier of the second UE to the first NF node. The first NF node then can transmit the contents of the first UE to the second UE.

Figure 8:
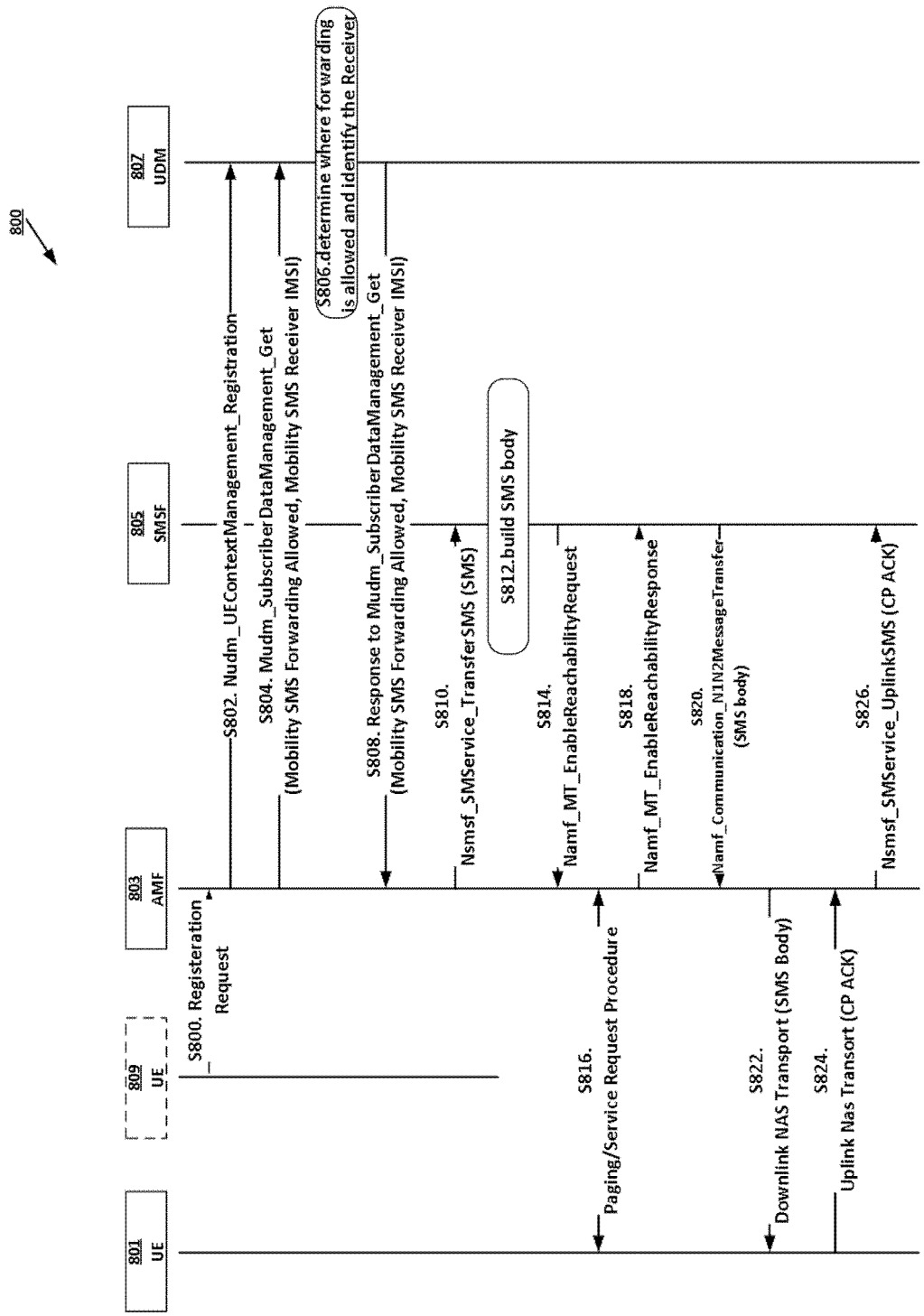
FIG. 8 shows an exemplifying signaling diagram illustrating details of the methods schematically illustrated in FIGS. 5-7.

FIG. 8 shows an exemplifying signaling diagram 800 illustrating details of the methods schematically illustrated in FIGS. 5-7.

The example shown in FIG. 7 involves a UE 801, an AMF 803, a SMSF 805, a UDM 807 and a UE 809. It is only an example and the present disclosure is not limited thereto.

At the registration phase, the UE 809 registers to the AMF 803 by a Registration Request (S800).

The AMF 803 registers with the UDM 807 using Nudm_UECM_Registration for the access to be registered (and subscribes to be notified when the UDM 807 deregisters the AMF 803) (S802).

The AMF 803 retrieves from the UDM 807 subscription data of a UE, e.g., a first UE which is the UE 809 shown in the embodiment, using Nudm_SDM_Get (S804).

The UDM 807 then determines whether content for the first UE are allowed to be forwarded, and identifies a second UE which is the target of the contents for the first UE (S806). If it is determined that content for the first UE are allowed to be forwarded, the UDM 807 identifies a different second UE. If it is determined that content for the first UE are not allowed to be forwarded, the UDM 807 would identify the first UE as the second UE or treat there is no second UE for this first UE.

The UDM 807 then transmits a response to Nudm_SDM_Get to AMF 803, the response including the identity of the second UE, for example, IMSI/MSISDN of the second UE, which is the UE 801 shown in the embodiment (S808).

Then the AMF 803 invokes an Nsmsf_SMService_TransferSMS service operation including the contents and a target UE ID (e.g., IMSI/MSISDN of the receiving UE, UE 801 in the example) to the SMSF 805 (S810) if there is any SMS of the UE 809 to be transferred later.

The SMSF 805 builds a SMS message with the SMS body having the provided contents (S812).

The SMSF 805 also invokes a Namf_MT_EnableUEReachability service operation to determine whether the target UE is reachable by for example, transmitting a Namf_MT_EnableUEReachability request to the AMF 803 (S814).

The AMF 803 pages the UE 801 (S816). The UE 801 responds the paging request with a Service Request message.

The AMF 803 then responds the SMSF 805 with a Namf_MT_EnableUEReachability response, to indicate that the UE 801 is reachable (S818).

The SMSF 805 forwards the SMS message to be sent as defined in TS 23.040 to the AMF 803 by invoking an Namf_Communication_N1N2MessageTransfer service operation (S820).

The AMF 803 transfers the SMS message to the UE 801 over downlink NAS transport (S822).

After having received the SMS message, the UE 801 transmits an acknowledgement message to the AMF 803 over uplink NAS transport to acknowledge the receipt of the SMS message (S824).

The AMF 803 then forwards the received acknowledgement message to the SMSF 805 by invoking an Nsmsf_SMService_UplinkSMS service operation (S826).

With the process as shown in FIG. 8, the contents of a first UE (the UE 809 in the example) is transmitted to a second UE (the UE 801 in the example) successfully.

With the proposed solution, it's beneficial for several use cases.

Use Case 1: instruct end user to adjust handset parameter Quite many China Mobile customers bought iPhones from Hong Kong which have original operator's default parameters setting in the phones. Such parameter setup caused continuous activation rejects with the wrong APN until the phone battery used up. We can see the Key Performance Indicator (KPI) of the network is seriously down. With this proposed solution, the SMS message will be sent to the end user who has such wrong setup to guide them to correct the parameter setting.

Use Case 2: instruct end user to debug the device A Cognitive Internet of Things (CIoT) device usually doesn't have any display or screen on the device, but before they are deployed in the field, we need to debug these devices and optimize them to suit for the customer case. It's a heavy burden for the business/device operator to debug them. Nowadays they usually use some instrument between some interfaces, e.g. N1/N2, to check the cause codes. This is not a convenient way to follow. With this proposed solution, such cause code and notification information could be transferred via a SMS message to the real target end user. Then a proper action could be taken by the end user to adjust the devices.

Use Case 3: indicate end user about the device mobility status The CIoT device status (even e.g. battery usage of the device) or the application related status could be transferred to the end user via an Over The Top (OTA) method. However, mobility status information, e.g. some devices should be stationary in some area which are not allowed to move to other area, can't be carried by the OTA method. With this proposed solution, such mobility status information could be transferred via a SMS message to the real target end user. Then a proper action could be taken by the end user.

Use Case 4: support network tuning/troubleshooting Sometimes it is not so easy to find the root cause of a fault or even reproduce a network fault, for instance some KPI decrease. With this solution, when such fault occurred on a trusted user, this user will receive a SMS message, which will guide him/her either do some action for the troubleshooting or report what happened in some specific time duration.

Use Case 5: support for the quick delivery for 5G NF A 5G core is a service based architecture. To have a quick delivery release of one NF, it will be good to let a trusted user group to use this new release firstly and provide feedback before deploying it on whole network to make it commercial. This solution will provide the possibility to inform the end user whether some NF is properly working in the network.

Figure 9:
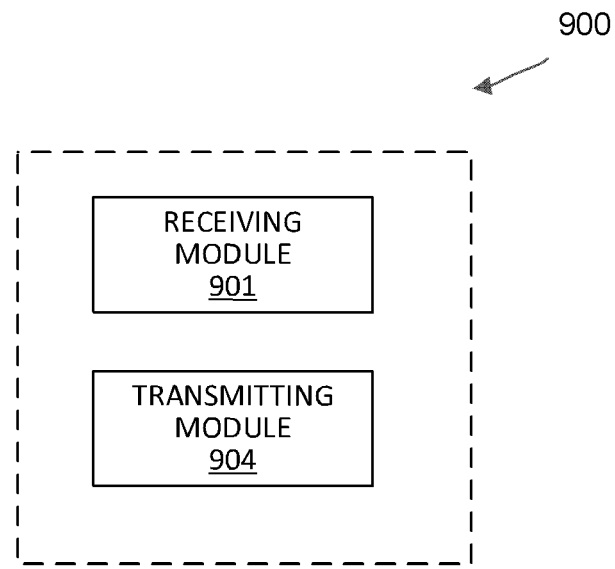
FIG. 9 illustratively shows a schematic structure diagram of a first NF node according to an exemplary embodiment of the present disclosure.

Hereinafter, a structure of a first NF node will be described with reference to FIG. 9. FIG. 9 illustratively shows a schematic structure diagram of a first NF node 900 (e.g., AMF 803 as shown in FIG. 8 as described previously) according to an exemplary embodiment of the present disclosure. The first NF node 900 in FIG. 9 may perform the method 500 for managing a communication of contents for a first UE described previously with reference to FIG. 5. Accordingly, some detailed description on the first NF node 900 may refer to the corresponding description of the method 500 for managing a communication of contents for a first UE as previously discussed.

As shown in FIG. 9, the first NF node 900 may include a receiving module 901 and a transmitting module 902. As will be understood by the skilled in the art, common components in the first NF node 900 are omitted in FIG. 9 for not obscuring the idea of the present disclosure. Also, some modules may be distributed in more modules or integrated into fewer modules. For example, the receiving module 901 and the transmitting module 902 may be integrated into a transceiver module.

In an exemplary embodiment of the present disclosure, the transmitting module 902 may be configured to retrieve subscription data for the first UE from a third NF node by, for example, transmitting a Nudm_SDM_Get request to the third NF node. The receiving module 901 may be configured to receive the subscription data which indicates an identifier of a second UE, which is a target of the contents for the first UE. The transmitting module 902 may be configured to transmit the contents and the identifier of the second UE to a second NF node. In response, the receiving module 901 may be configured to receive a message built with the contents from the second NF node. The transmitting module 902 may be configured to transmit the message to the second UE.

In another exemplary embodiment of the present disclosure, the second UE may be different from the first UE, or same as the first UE. That is, if the subscription data indicates a different second UE, the contents for the first UE can be forwarded to the second UE. Otherwise, if the second UE indicated by the subscription data is the same as the first UE, the contents for the first UE cannot be forwarded to a different UE, and only can be forwarded to the first UE.

In another exemplary embodiment of the present disclosure, the receiving module 901 of the first NF node 900 may be further configured to receive a reachability enabling request from the second NF node. The transmitting module 902 may be configured to page the second UE, and the receiving module 901 may be configured to receive a Service Request message from the second UE. Then the transmitting module 902 may be configured to transmit a reachability enabling response to indicate that the second UE is reachable to the second NF node.

In another exemplary embodiment of the present disclosure, the receiving module 901 of the first NF node 900 may be further configured to receive an acknowledgement message from the second UE to acknowledge the receipt of the message. The transmitting module 902 then may be configured to transmit the acknowledgement message to the second NF node.

In an exemplary embodiment of the present disclosure, the message is a Short Message Service (SMS) message and the second NF node is a Short Message Service Function (SMSF) node.

In an exemplary embodiment of the present disclosure, the third NF node is a Unified Data Management (UDM) node, and the subscription data indicates whether the contents for the first UE are allowed to be forwarded.

In an exemplary embodiment of the present disclosure, the identity of the second UE is an International Mobile Subscriber Identification (IMSI) number of the second UE.

In an exemplary embodiment of the present disclosure, the first NF node is an Access and Mobility Management Function (AMF) node.

Figure 10:
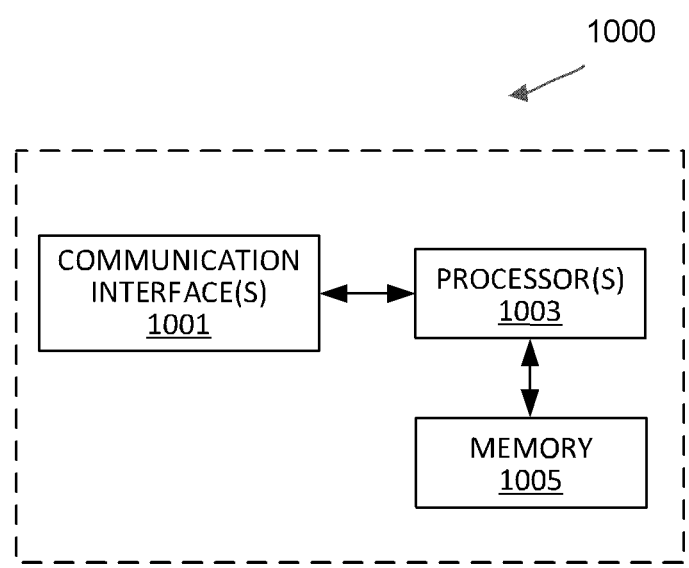
FIG. 10 illustratively shows a schematic structure diagram of a first NF node according to an exemplary embodiment of the present disclosure.

Hereinafter, another structure of a first NF node 1000 will be described with reference to FIG. 10. FIG. 10 illustratively shows a schematic structure diagram of a first NF node 1000 (e.g., AMF 803 as shown in FIG. 8 as described previously) according to an exemplary embodiment of the present disclosure. The first NF node 1000 in FIG. 10 may perform the method 500 for managing a communication of contents for a first UE described previously with reference to FIG. 5. Accordingly, some detailed description on the first NF node 1000 may refer to the corresponding description of the method 500 for managing a communication of contents for a first UE as previously discussed.

As shown in FIG. 10, the first NF node 1000 may include at least one controller or processor 1003 including e.g., any suitable Central Processing Unit, CPU, microcontroller, Digital Signal Processor, DSP, etc., capable of executing computer program instructions. The computer program instructions may be stored in a memory 1005. The memory 1005 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary first NF node 1000 further comprises a communication interface 1001 arranged for communication.

The instructions, when loaded from the memory 1005 and executed by the at least one processor 1003, may cause the first NF node 1000 to perform the method 500 for managing a communication of contents for a first UE as previously discussed.

In particular, in an exemplary embodiment of the present disclosure, the instructions, when loaded from the memory 1005 and executed by the at least one processor 1003, may cause the first NF node 1000 to retrieve subscription data for the first UE from a third NF node. The subscription data indicates an identifier of a second UE, which is a target of the contents for the first UE.

In an exemplary embodiment of the present disclosure, the second UE may be different from the first UE, or same as the first UE. That is, if the subscription data indicates a different second UE, the contents for the first UE can be forwarded to the second UE. Otherwise, if the second UE indicated by the subscription data is the same as the first UE, the contents for the first UE cannot be forwarded to a different UE, and only can be forwarded to the first UE.

In response to retrieval of the subscription data, the instructions, when loaded from the memory 1005 and executed by the at least one processor 1003, may cause the first NF node 1000 to transmit the contents and the identifier of the second UE to a second NF node.

In response to transmission of the contents and the identifier, the instructions, when loaded from the memory 1005 and executed by the at least one processor 1003, may cause the first NF node 1000 to receive a message built with the contents from the second NF node, and transmit the message to the second UE.

In another exemplary embodiment of the present disclosure, the instructions, when loaded from the memory 1005 and executed by the at least one processor 1003, may cause the first NF node 1000 to receive a reachability enabling request from the second NF node. In response to receipt of the reachability enabling request, the instructions, when loaded from the memory 1005 and executed by the at least one processor 1003, may cause the first NF node 1000 to page the second UE. After receiving a Service Request message from the second UE in response to page, the instructions, when loaded from the memory 1005 and executed by the at least one processor 1003, may cause the first NF node 1000 to transmit a reachability enabling response to indicate that the second UE is reachable to the second NF node.

In another exemplary embodiment of the present disclosure, the instructions, when loaded from the memory 1005 and executed by the at least one processor 1003, may cause the first NF node 1000 to receive an acknowledgement message from the second UE to acknowledge the receipt of the message, and forward the acknowledgement message to the second NF node.

Figure 11:
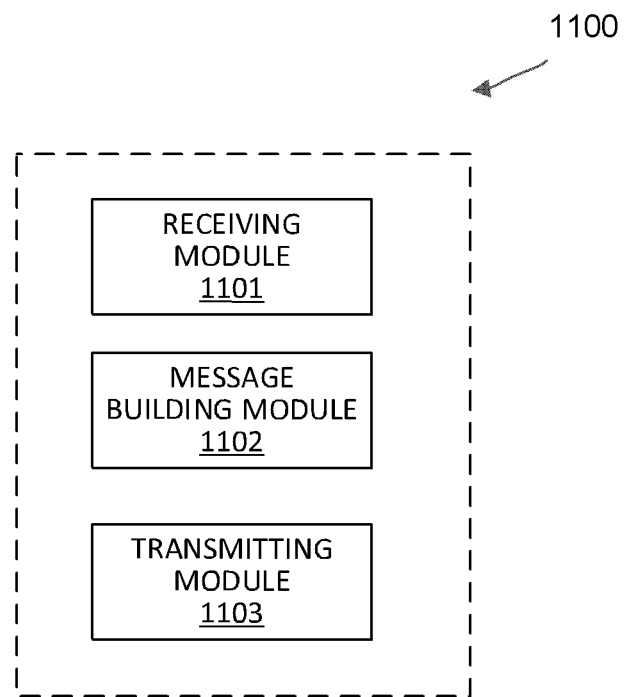
FIG. 11 illustratively shows a schematic structure diagram of a second NF node according to an exemplary embodiment of the present disclosure.

Hereinafter, a structure of a second NF node will be described with reference to FIG. 11. FIG. 11 illustratively shows a schematic structure diagram of a second NF node 1100 (e.g., SMSF 805 as shown in FIG. 8 as described previously) according to an exemplary embodiment of the present disclosure. The second NF node 1100 in FIG. 11 may perform the method 600 for managing a communication of contents of a UE described previously with reference to FIG. 6. Accordingly, some detailed description on the second NF node 1100 may refer to the corresponding description of the method 1100 for managing a communication of contents of a UE as previously discussed.

As shown in FIG. 11, the second NF node 1100 may include a receiving module 1101, a message building module 1102 and a transmitting module 1103. As will be understood by the skilled in the art, common components in the second NF node 1100 are omitted in FIG. 11 for not obscuring the idea of the present disclosure. Also, some modules may be distributed in more modules or integrated into fewer modules. For example, the receiving module 1101 and the transmitting module 1103 may be integrated into a transceiver module.

In an exemplary embodiment of the present disclosure, the receiving module 1101 may be configured to receive contents and an identifier of the UE from a first NF node. In response to the receipt of the contents and the identifiers, the message building module 1102 may be configured to build a message with the contents, and the transmitting module 1103 may be configured to transmit the message built by the message building module 1102 to the first NF node.

In another exemplary embodiment of the present disclosure, the transmitting module 1103 may be configured to transmit a reachability enabling request to the first NF node in response to the receipt of the contents and the identifiers. The receiving module 1101 may be configured to receive from the first NF node a reachability enabling response indicating that the UE is reachable in response to the transmission of the reachability enabling request.

In another exemplary embodiment of the present disclosure, the receiving module 1101 may be configured to, after the message has been transmitted, receive an acknowledgement message from the UE to acknowledge a receipt of the message via the first NF node.

In an exemplary embodiment of the present disclosure, the message is a Short Message Service (SMS) message and the second NF node is a Short Message Service Function (SMSF) node.

In an exemplary embodiment of the present disclosure, the first NF node is an Access and Mobility Management Function (AMF) node.

Figure 12:
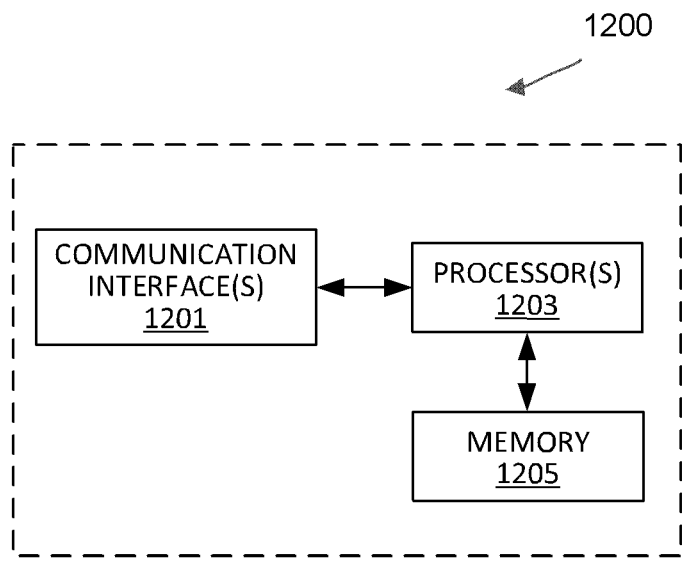
FIG. 12 illustratively shows a schematic structure diagram of a second NF node according to an exemplary embodiment of the present disclosure.

Hereinafter, another structure of a second NF node 1200 will be described with reference to FIG. 12. FIG. 12 illustratively shows a schematic structure diagram of a second NF node 1200 (e.g., SMSF 805 as shown in FIG. 8 as described previously) according to an exemplary embodiment of the present disclosure. The second NF node 1200 in FIG. 12 may perform the method 600 for managing a communication of contents of a UE described previously with reference to FIG. 6. Accordingly, some detailed description on the first NF node 1000 may refer to the corresponding description of the method 600 for managing a communication of contents of a UE as previously discussed.

As shown in FIG. 12, the second NF node 1200 may include at least one controller or processor 1203 including e.g., any suitable Central Processing Unit, CPU, microcontroller, Digital Signal Processor, DSP, etc., capable of executing computer program instructions. The computer program instructions may be stored in a memory 1205. The memory 1205 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary second NF node 1200 further comprises a communication interface 1201 arranged for communication.

The instructions, when loaded from the memory 1205 and executed by the at least one processor 1203, may cause the second NF node 1200 to perform the method 600 for managing a communication of contents of a UE as previously discussed.

In particular, in an exemplary embodiment of the present disclosure, the instructions, when loaded from the memory 1205 and executed by the at least one processor 1203, may cause the second NF node 1200 to receive contents and an identifier of the UE from a first NF node.

In response to receipt of the contents and the identifier, the instructions, when loaded from the memory 1205 and executed by the at least one processor 1203, may cause the second NF node 1200 to build a message with the contents, and transmit the built message to the first NF node.

In another exemplary embodiment of the present disclosure, the instructions, when loaded from the memory 1205 and executed by the at least one processor 1203, may cause the second NF node 1200 to transmit a reachability enabling request to the first NF node in response to the receipt of the contents and the identifiers. The instructions, when loaded from the memory 1205 and executed by the at least one processor 1203, may cause the second NF node 1200 to receive from the first NF node a reachability enabling response indicating that the UE is reachable in response to the transmission of the reachability enabling request.

In another exemplary embodiment of the present disclosure, the instructions, when loaded from the memory 1205 and executed by the at least one processor 1203, may cause the second NF node 1200 receive an acknowledgement message from the UE to acknowledge a receipt of the message via the first NF node, after the message has been transmitted, In an exemplary embodiment of the present disclosure, the message is a Short Message Service (SMS) message and the second NF node is a Short Message Service Function (SMSF) node.

In an exemplary embodiment of the present disclosure, the first NF node is an Access and Mobility Management Function (AMF) node.

Figure 13:
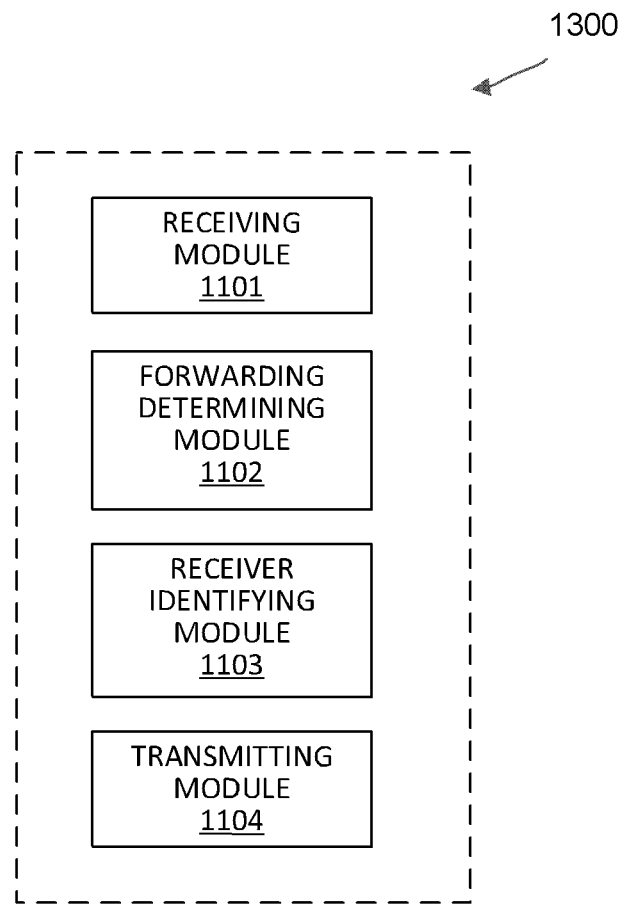
FIG. 13 illustratively shows a schematic structure diagram of a third NF node according to an exemplary embodiment of the present disclosure.

Hereinafter, a structure of a third NF node will be described with reference to FIG. 13. FIG. 13 illustratively shows a schematic structure diagram of a third NF node 1300 (e.g., UDM 807 as shown in FIG. 8 as described previously) according to an exemplary embodiment of the present disclosure. The third NF node 1300 in FIG. 13 may perform the method 700 for managing a communication of contents for a first UE described previously with reference to FIG. 7. Accordingly, some detailed description on the third NF node 1300 may refer to the corresponding description of the method 700 for managing a communication of contents for a first UE as previously discussed.

As shown in FIG. 13, the third NF node 1300 may include a receiving module 1301, a forwarding determining module 1302, a receiver identifying module 1303 and a transmitting module 1304. As will be understood by the skilled in the art, common components in the second NF node 1300 are omitted in FIG. 13 for not obscuring the idea of the present disclosure. Also, some modules may be distributed in more modules or integrated into fewer modules. For example, the receiving module 1301 and the transmitting module 1304 may be integrated into a transceiver module.

In an exemplary embodiment of the present disclosure, the receiving module 1301 may be configured to receive a subscription data request with an identifier of the first UE from a first NF node.

In response to the receipt of the subscription data request, the forwarding determining module 1302 may be configured to determine whether contents for the first UE are allowed to be forwarded.

The receiver identifying module 1303 may be configured to identify a second UE as a target of the contents for the first UE.

If the forwarding determining module 1302 determines that contents for the first UE are allowed to be forwarded, the receiver identifying module 1303 may be configured to identify a second UE different from the first UE. If the forwarding determining module 1302 determines that contents for the first UE are not allowed to be forwarded, the receiver identifying module 1303 may be configured to identify the second UE as the first UE.

The transmitting module 1304 may be configured to transmit a subscription data response with an identifier of the second UE to the first NF node.

In an exemplary embodiment of the present disclosure, the third NF node is preconfigured with information indicating whether contents for the UE are allowed to be forwarded and indicating the second UE different from the first UE if the contents for the first UE are allowed to be forwarded. The forwarding determining module 1302 in the third NF node 1300 looks in its preconfigured information to determine whether contents for the first UE are allowed to be forwarded and identifies the second UE that shall receive the contents for the first UE.

In an exemplary embodiment of the present disclosure, the first NF node is an Access and Mobility Management Function (AMF) node and the third NF node is a Unified Data Management (UDM) node.

Figure 14:
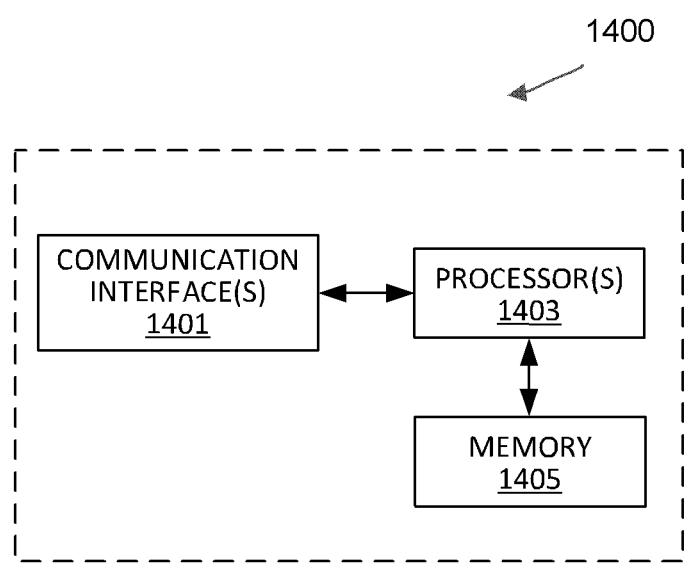
FIG. 14 illustratively shows a schematic structure diagram of a third NF node according to an exemplary embodiment of the present disclosure.

Hereinafter, another structure of a third NF node 1400 will be described with reference to FIG. 14. FIG. 14 illustratively shows a schematic structure diagram of a third NF node 1400 (e.g., UDM 805 as shown in FIG. 8 as described previously) according to an exemplary embodiment of the present disclosure. The third NF node 1400 in FIG. 14 may perform the method 700 for managing a communication of contents for a first UE described previously with reference to FIG. 7. Accordingly, some detailed description on the third NF node 1400 may refer to the corresponding description of the method 700 for managing a communication of contents for a first UE as previously discussed.

As shown in FIG. 14, the third NF node 1400 may include at least one controller or processor 1403 including e.g., any suitable Central Processing Unit, CPU, microcontroller, Digital Signal Processor, DSP, etc., capable of executing computer program instructions. The computer program instructions may be stored in a memory 1405. The memory 1405 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The exemplary first NF node 1400 further comprises a communication interface 1401 arranged for communication.

The instructions, when loaded from the memory 1405 and executed by the at least one processor 1403, may cause the third NF node 1400 to perform the method 700 for managing a communication of contents for a first UE as previously discussed.

In particular, in an exemplary embodiment of the present disclosure, the instructions, when loaded from the memory 1405 and executed by the at least one processor 1403, may cause the third NF node 1400 to receive a subscription data request with an identifier of the first UE from a first NF node.

In response to the receipt of the subscription data request, the instructions, when loaded from the memory 1405 and executed by the at least one processor 1403, may cause the third NF node 1400 to determine whether contents for the first UE are allowed to be forwarded, identify a second UE which is a target of the contents for the first UE based on the determining, and transmit a subscription data response with an identifier of the second UE to the first NF node.

In an exemplary embodiment of the present disclosure, the third NF node is preconfigured with information indicating whether contents for the first UE are allowed to be forwarded and indicating the second UE different from the first UE if the contents for the first UE are allowed to be forwarded. The instructions, when loaded from the memory 1405 and executed by the at least one processor 1403, may cause the third NF node 1400 to look in its preconfigured information to determine whether contents for the first UE are allowed to be forwarded and identify the second UE that shall receive the contents for the first UE.

In an exemplary embodiment of the present disclosure, if it is determined that contents for the first UE are not allowed to be forwarded, the third NF node identifies the contents for the first UE cannot be forwarded to a different UE, and identifies the second UE as the first UE.

In an exemplary embodiment of the present disclosure, the first NF node is an Access and Mobility Management Function (AMF) node and the third NF node is a Unified Data Management (UDM) node.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method implemented at a first Network Function (NF) node for managing a communication of contents for a first User Equipment (UE), comprising:
   retrieving subscription data for the first UE from a third NF node, the subscription data indicating an identifier of a second UE which is a target of the contents for the first UE,
   transmitting the contents and the identifier of the second UE to a second NF node,
   receiving a message built with the contents from the second NF node, and
   transmitting the message to the second UE.

2. The method of claim 1, wherein prior to receiving the message, the method further comprises:
   performing a reachability enabling procedure to the second UE in response to receiving a reachability enabling request from the second NF node, and
   responding the second NF node with a reachability enabling response to indicate that the second UE is reachable.

3. The method of claim 1, wherein the second UE is different from or same as the first UE.

4. The method of claim 1, wherein after transmitting the message, the method further comprises:
   in response to receiving an acknowledgement message from the second UE to acknowledge the receipt of the message, forwarding the acknowledgement message to the second NF node.

5. The method of claim 1, wherein the message is a Short Message Service (SMS) message and the second NF node is a Short Message Service Function (SMSF) node, wherein the third NF node is a Unified Data Management (UDM) node, and the subscription data indicates whether the contents for the first UE are allowed to be forwarded, wherein the identity of the second UE is an International Mobile Subscriber Identification (IMSI) number of the second UE, and/or wherein the first NF node is an Access and Mobility Management Function (AMF) node.

6. A method implemented at a second Network Function (NF) node for managing a communication of contents for a User Equipment (UE), comprising:
   receiving contents and an identifier of the UE from a first NF node,
   building a message with the contents, and
   transmitting the message to the first NF node.

7. The method of claim 6, wherein prior to transmitting the message, the method further comprises:
   transmitting a reachability enabling request to the first NF node, and
   receiving from the first NF node a reachability enabling response indicating that the UE is reachable.

8. The method of claim 6, further comprising:
   receiving an acknowledgement message from the UE to acknowledge a receipt of the message via the first NF node.

9. The method of claim 6, wherein the message is a Short Message Service (SMS) message and the second NF node is a Short Message Service Function (SMSF) node, and/or wherein the first NF node is an Access and Mobility Management Function (AMF) node.

10. A method implemented at a third Network Function (NF) node for managing a communication of contents for a first User Equipment (UE), comprising:
    receiving a subscription data request with an identifier of the first UE from a first NF node,
    determining whether contents for the first UE are allowed to be forwarded,
    identifying a second UE which is a target of the contents for the first UE to the first NF node based on the determining, and
    transmitting a subscription data response with an identifier of the second UE to the first NF node.

11. The method of claim 10, wherein the third NF node is preconfigured with information indicating whether contents for the first UE are allowed to be forwarded and indicating the second UE different from the first UE if the contents for the first UE are allowed to be forwarded.

12. The method of claim 10, wherein the second UE is the same as the first UE if it is determined that contents for the first UE are not allowed to be forwarded, and/or wherein the first NF node is an Access and Mobility Management Function (AMF) node and the third NF node is a Unified Data Management (UDM) node.

13. A first Network Function (NF) node for managing a communication of contents for a first User Equipment (UE), comprising:
    a communication interface arranged for communication,
    at least one processor, and
    a memory comprising instructions which, when executed by the at least one processor, cause the first NF node to:
       retrieve subscription data for the first UE from a third NF node, the subscription data indicating an identifier of a second UE which is a target of the contents for the first UE,
       transmit the contents and the identifier of the second UE to a second NF node,
       receive a message built with the contents from the second NF node, and
       transmit the message to the second UE.

14. The first NF node (1000) according to claim 13, wherein the instructions, when executed by the at least one processor (1003), further cause the first NF node (1000), prior to receiving (S530) the message, to perform (S522) a reachability enabling procedure to the second UE in response to receiving a reachability enabling request from the second NF node, and respond (S524) the second NF node with a reachability enabling response to indicate that the second UE is reachable.

15. The first NF node (1000) according to claim 13, wherein the second UE is different from or same as the first UE.

16. The first NF node (1000) according to claim 13, wherein the instructions, when executed by the at least one processor (1003), further cause the first NF node (1000), after transmitting (S540) the message, in response to receiving an acknowledgement message from the second UE to acknowledge the receipt of the message, to forward (S550) the acknowledgement message to the second NF node.

17. The first NF node (1000) according to claim 13, wherein the message is a Short Message Service (SMS) message and the second NF node is a Short Message Service Function (SMSF) node, wherein the third NF node is a Unified Data Management (UDM) node, and the subscription data indicates whether the contents for the first UE are allowed to be forwarded, wherein the identity of the second UE is an International Mobile Subscriber Identification (IMSI) number of the second UE, and/or wherein the first NF node is an Access and Mobility Management Function (AMF) node.

* * * * *